United States Patent
Dinnage

(10) Patent No.: US 9,945,569 B2
(45) Date of Patent: Apr. 17, 2018

(54) WATER MINIMIZING METHOD AND APPARATUS FOR USE WITH EVAPORATIVE COOLING DEVICES

(71) Applicant: Munters Corporation, Selma, TX (US)

(72) Inventor: Paul A. Dinnage, New Braunfels, TX (US)

(73) Assignee: Munters Corporation, Selma, TX (US)

( * ) Notice: Subject to any disclaimer, the term of this patent is extended or adjusted under 35 U.S.C. 154(b) by 264 days.

(21) Appl. No.: 14/641,106

(22) Filed: Mar. 6, 2015

(65) Prior Publication Data

US 2016/0069577 A1   Mar. 10, 2016

Related U.S. Application Data

(60) Provisional application No. 62/048,541, filed on Sep. 10, 2014.

(51) Int. Cl.
*F28C 1/00* (2006.01)
*F24F 5/00* (2006.01)
*F28D 5/00* (2006.01)

(52) U.S. Cl.
CPC .............. *F24F 5/0035* (2013.01); *F28D 5/00* (2013.01)

(58) Field of Classification Search
CPC .............................. F24F 5/0035; F24F 5/0085
USPC ............ 62/121, 171, 304, 310, 315, 333, 93
See application file for complete search history.

(56) References Cited

U.S. PATENT DOCUMENTS

| | | | |
|---|---|---|---|
| 3,865,911 A | 2/1975 | Lefevre | |
| 5,181,387 A | 1/1993 | Meckler | |
| 5,339,854 A | 8/1994 | Leith | |
| 5,756,047 A * | 5/1998 | West | A61L 2/18 422/124 |
| 5,857,350 A * | 1/1999 | Johnson | F24F 5/0035 261/106 |
| 6,367,277 B1 * | 4/2002 | Kinkel | F24F 5/0035 261/98 |

(Continued)

FOREIGN PATENT DOCUMENTS

WO   2012/109550 A1   8/2012
WO   2013/021147 A1   2/2013

OTHER PUBLICATIONS

International Search Report and Written Opinion of International Application No. PCT/US2015/049418.

*Primary Examiner* — Melvin Jones
(74) *Attorney, Agent, or Firm* — Fitzpatrick, Cella, Harper & Scinto

(57) ABSTRACT

An evaporative cooling system includes a primary cooling unit that utilizes a cooling fluid flowing through a primary heat exchange medium to cool supply air flowing past the primary heat exchange medium, a bleed line and a secondary cooling unit disposed upstream of the primary cooling unit with respect to a flow direction of the supply air. The primary cooling unit includes a supply line for supplying the cooling fluid to the primary heat exchange medium, a reservoir for collecting the cooling fluid supplied to the primary heat exchange medium, and a pump for recirculating the cooling fluid collected in the reservoir back to the supply line. The bleed line bleeds a portion of the recirculating cooling fluid from the primary cooling unit. The secondary cooling unit includes a secondary heat exchange medium that receives the cooling fluid bled from the primary cooling unit through the bleed line.

21 Claims, 3 Drawing Sheets

(56) References Cited

U.S. PATENT DOCUMENTS

2005/0016197 A1* 1/2005 Bourne .................... F28C 3/08
  62/310
2007/0163772 A1* 7/2007 Bhatti .................... F28F 1/126
  165/202

* cited by examiner

WATER MINIMIZING METHOD AND APPARATUS FOR USE WITH EVAPORATIVE COOLING DEVICES

REFERENCE TO RELATED APPLICATION

This application claims the benefit of U.S. Provisional Patent Application No. 62/048,541, filed Sep. 10, 2014.

BACKGROUND OF THE INVENTION

1. Field of the Invention

The present invention is directed to improvements in evaporative cooling systems, conditioning systems that utilize thermodynamic laws to cool a fluid. Namely, a change of a fluid from a liquid phase to a vapor phase can result in a reduction in temperature due to the heat of vaporization involved in the phase change.

2. Related Background Art

In a typical evaporative cooler, raw water is supplied to or recirculated through a heat exchanger and is vaporized by extracting heat from supply air flowing through the heat exchanger. Most readily available forms of raw water include various contaminants, most notably dissolved salts and minerals. In a recirculating evaporative cooling system, excess water supplied to the heat exchanger that has not evaporated is collected in a reservoir and then pumped back to the heat exchanger. As the water evaporates from heat exchange, minerals and salts dissolved in the raw water remain, building in concentration as the water volume decreases. Make-up water is supplied to the system to compensate for the evaporated water, but the salts and minerals remain and can become deposited on the heat exchanger as sealants if the concentration is too high.

In order to alleviate high concentrations of sealants, most evaporative cooling devices that use water incorporate a water bleed to drain to control salt and mineral content in the reservoir. The techniques to determine an effective amount of bleed are varied and well-known. In general, the amount of bleed is dependent on the level of mineral contamination in the feed water and water chemistry, but varies from as low as about 10% of the feed water for very fresh water to as much as 50% or more of the feed water where mineral content is high. Even where chemical treatment is utilized to extend solubility of the minerals, bleed is still required to replace water saturated with minerals with fresh water to prevent scaling within the evaporative process.

FIG. 3 represents a schematic of a typical direct evaporative cooler 100. Water or another suitable cooling liquid is recirculated from a reservoir 110 through a supply line 112 to a distributor 116 using a pump 114. Distributor 116 evenly distributes the supplied water over a heat exchanger, such as evaporative pad 118. Supply air 124 is passed through the pad, where it is cooled and humidified to exit as cooled air 126. The water fed from distributor 16 flows down and through the pad and evaporates as it meets the warm supply air 124. A bleed stream controlled by valve 120, for example, is removed from the system through bleed or drain line 121 to drain 122 to control mineral build-up in the water. Fresh make-up water is added as needed from water supply 128 to replace the water evaporated and bled. The make-up water can be controlled by a float valve or other level sensing device (not shown) provided in the reservoir 110.

FIG. 4 depicts a typical indirect evaporative cooler, in this instance a fluid cooler 200. Fluid cooler 200 includes a housing 202 having air inlets 204 and an air outlet 206. A sump 210 that functions as a reservoir is disposed at the bottom of housing 202. A heat exchanger 218, having a fluid inlet 218-1 and a fluid outlet 218-2, is disposed above sump 210. Water or another suitable coolant is drawn from sump 210 through supply line 212 using a pump 214. The pumped water is supplied to a spray head 216, which sprays the water over heat exchanger 218 so as to draw heat from the heat exchanger. The sprayed water is collected in the sump 210. As in the direct evaporative cooler, in order to control the concentration of salts and minerals in the cooling water, a bleed valve 220 is provided in supply line 212 in order to bleed off cooling water through bleed line 221 to drain 222. Air is drawn through air inlets 204 and out air outlet 206 using a fan 230 driven by a motor 232 via a belt. The fluid to be cooled is supplied to heat exchanger 218 through inlet 218-1 and discharged through outlet 218-2.

In operation, as shown in FIG. 4, cool air 226 is first passed over the outer surface of heat exchanger 218, through which flows a hot fluid to be cooled. The fluid to be cooled may be a liquid such as water, or a gas, such as air. The heat exchanger 218 is sprayed with a recirculated water stream using supply line 212, pump 214 and spray head 216 and an air stream is simultaneously generated to flow over the wet exchanger surface to evaporate water and produce cooling of the primary fluid inside the heat exchanger. As in the case in the direct evaporative system, a bleed or water from the recirculation sump is required to prevent mineral build-up. Make-up water is added from supply 228 to replenish the evaporated and bled water.

In both the direct and indirect evaporative cooling systems, the bled water is directed to drain and is otherwise not used. Such can result in substantial waste of cooling water. This waste can significantly increase the cost of operating the system and also place a significant burden on water supplies, particularly in areas where fresh water is scarce.

SUMMARY OF THE INVENTION

The present invention can improve the efficiency and effectiveness of evaporative cooling systems by utilizing bleed off cooling water in a supplemental cooling process.

The present invention can utilize the bleed water to provide a portion of the evaporative work and reduce the water lost to drain and thus the total amount of water consumed by the evaporative cooling system.

The present invention can provide an alternative to water pre-treatment or chemical treatment as a means of reducing bleed water requirements and thus total water usage. It may be used alone or in conjunction with other techniques.

In one aspect of the present invention, an evaporative cooling system includes a primary cooling unit that utilizes a cooling fluid flowing through a primary heat exchange medium to cool supply air flowing past the primary heat exchange medium, a bleed line and a secondary cooling unit disposed upstream of the primary cooling unit with respect to a flow direction of the supply air. The primary cooling unit includes a supply line for supplying the cooling fluid to the primary heat exchange medium, a return reservoir for collecting the cooling fluid supplied to the primary heat exchange medium, and a pump for recirculating the cooling fluid collected in the reservoir back to the supply line. The bleed line is configured to bleed a portion of the recirculating cooling fluid from the primary cooling unit. The secondary cooling unit includes a secondary heat exchange medium configured to receive the cooling fluid bled from the primary cooling unit through the bleed line.

In another aspect of the present invention, a gas conditioning system includes a primary conditioning unit, a bleed line and a secondary conditioning unit. The primary conditioning unit is configured to condition a gas flowing therethrough, and utilizes a conditioning fluid to condition the flowing gas. The bleed line is configured to bleed a portion of the conditioning fluid from the primary conditioning unit. The secondary conditioning unit is disposed upstream of the primary conditioning unit with respect to a flow direction of the gas, and utilizes the conditioning fluid bled from the primary conditioning unit through the bleed line to pre-condition the flowing gas.

In yet another aspect of the present invention, a method of cooling supply air in an evaporative cooling system includes supplying cooling fluid to a primary heat exchange medium; bleeding a portion of the cooling fluid supplied to the primary heat exchange medium; supplying the bled cooling fluid to a secondary heat exchange medium; and flowing the supply air through the primary heat exchange medium and the secondary heat exchange medium.

These and other aspects and advantages will become apparent when the description below is read in conjunction with the accompanying drawings.

DETAILED DESCRIPTION OF THE PREFERRED EMBODIMENTS

In a system of the present invention, the bleed water from an evaporative cooler is utilized to cool the air entering an evaporative section of a typical evaporative cooling system, such as a system described above with respect to FIGS. 3 and 4. This is accomplished by passing the bled water over dewatering media, which is itself a direct evaporative cooling section. The dewatering media cools and humidifies the air before entering a principal evaporative cooling process described above.

The evaporative cooling device following the dewatering media can be of any type, including, as discussed above, the direct evaporative type where water is evaporated into the air as a means to cool the air and the indirect evaporative type where water is evaporated into an air stream as a means to cool a third fluid contained in a heat exchanger that is wetted in the evaporative cooling zone, and even a cooling tower, where water is evaporated to an air stream as a means to cool a water supply.

Figure 1:
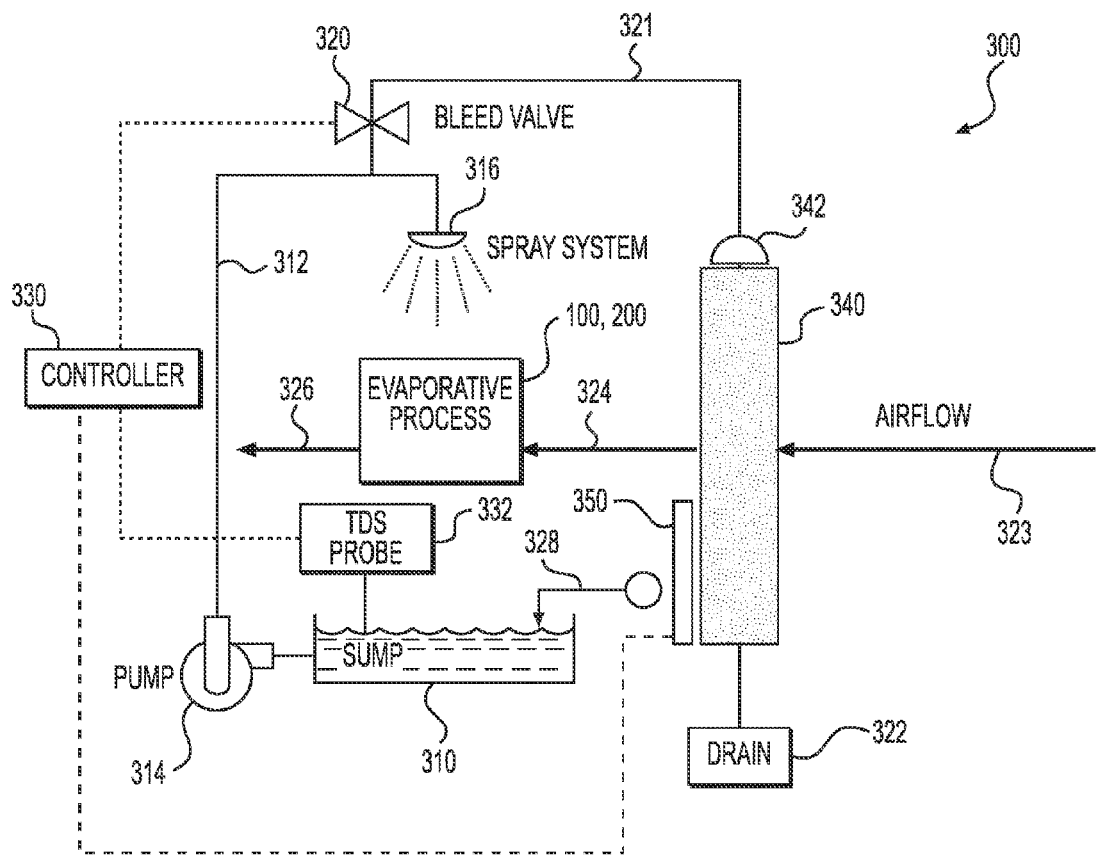
FIG. 1 is a schematic view of an evaporative cooling system of a first embodiment of the present invention.

FIG. 1 is a schematic view of an evaporative cooling system of a first embodiment of the present invention. Evaporative cooling system 300 utilizes one of the typical direct or indirect evaporative coolers described with respect to FIGS. 2 and 3, which is used as a primary cooling apparatus. The selected primary cooling apparatus is schematically shown by reference numerals 100, 200 in FIG. 1. As in the typical evaporative cooling apparatuses, the system of the first embodiment of the present invention includes a sump or reservoir 310, supply line 312, pump 314 and distributor or spray head 342. These components are used to supply water or another suitable cooling fluid to the primary evaporator of the apparatus, that is, evaporative pad 118 or heat exchanger 218.

In order to lower the concentration of minerals and salts in the cooling water, the system of the current embodiment utilizes a bleed valve 320 and a bleed line 321 to bleed off a fraction of the cooling water. By bleeding off a fraction of the cooling water, the residual amount of minerals and salts in the cooling fluid can be minimized, thereby preventing scale from developing on the primary evaporative pad 118 or heat exchanger 218.

As in the typical evaporative cooling examples, in the present embodiment, the cooling water flows down the primary evaporative pad 118 or heat exchanger 218 and is collected in sump 310 to be recirculated by pump 314 back to the distributor or spray head 342. As the water level in the sump decreases due to evaporation and bleed off, make-up water can be supplied to sump or reservoir 310 from water supply 328, which is controlled by a float valve (not shown) or any other suitable device.

As noted above, the amount of bleed from supply line 312 is determined by bleed valve 320. In the present embodiment, bleed valve 320 is variable and controllable by a controller 330. Controller 330 can be any suitable systems microcontroller. The parameters of the bleed valve can be preset and adjusted according to system conditions. As one example, a total dissolved solids (TDS) meter or probe 332 can be provided somewhere in the recirculating cooling water circuit, such as at the sump 310, to determine the amount of dissolved solids in the cooling liquid. A signal from TDS meter 332 to controller 330 can be analyzed so that controller 330 controls bleed valve 320 to bleed a greater percentage of cooling water as the amount of detected solids increases.

Figure 3:
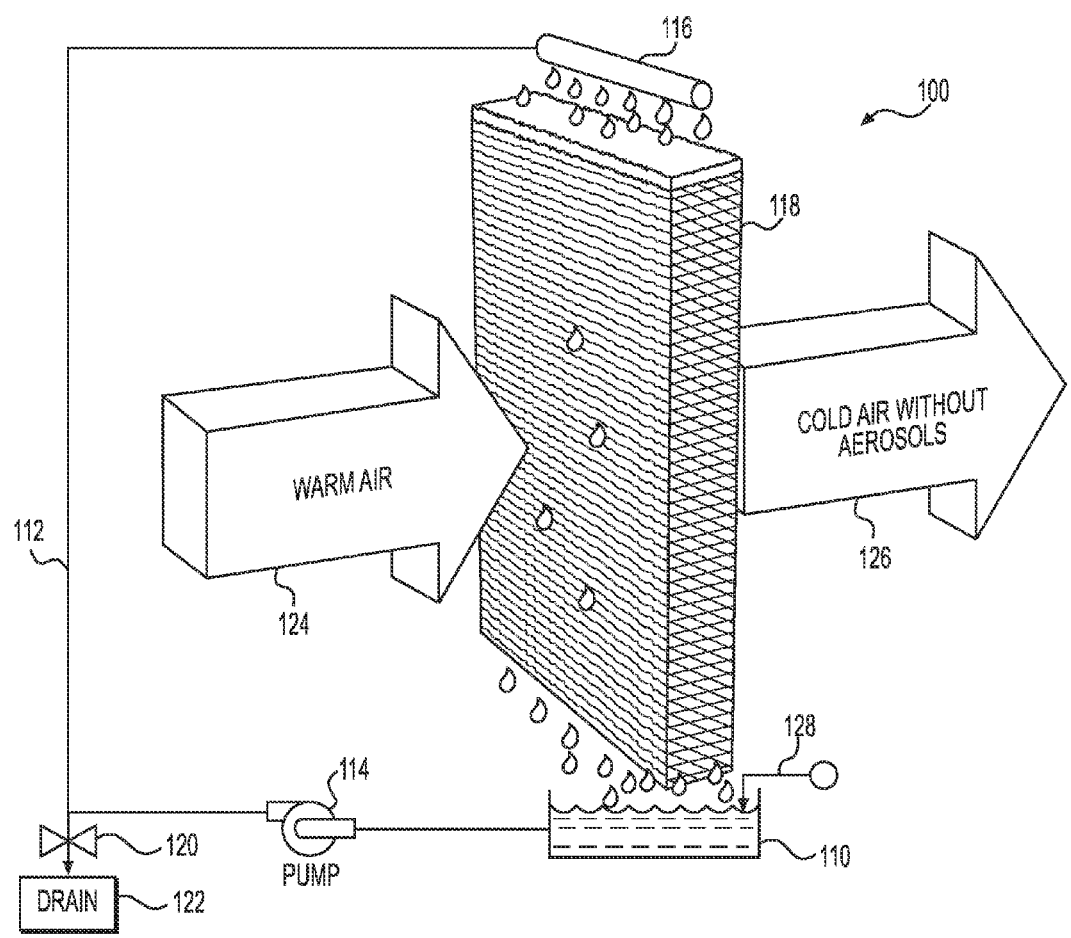
FIG. 3 is a schematic view of a typical direct evaporative cooling system.
Figure 4:
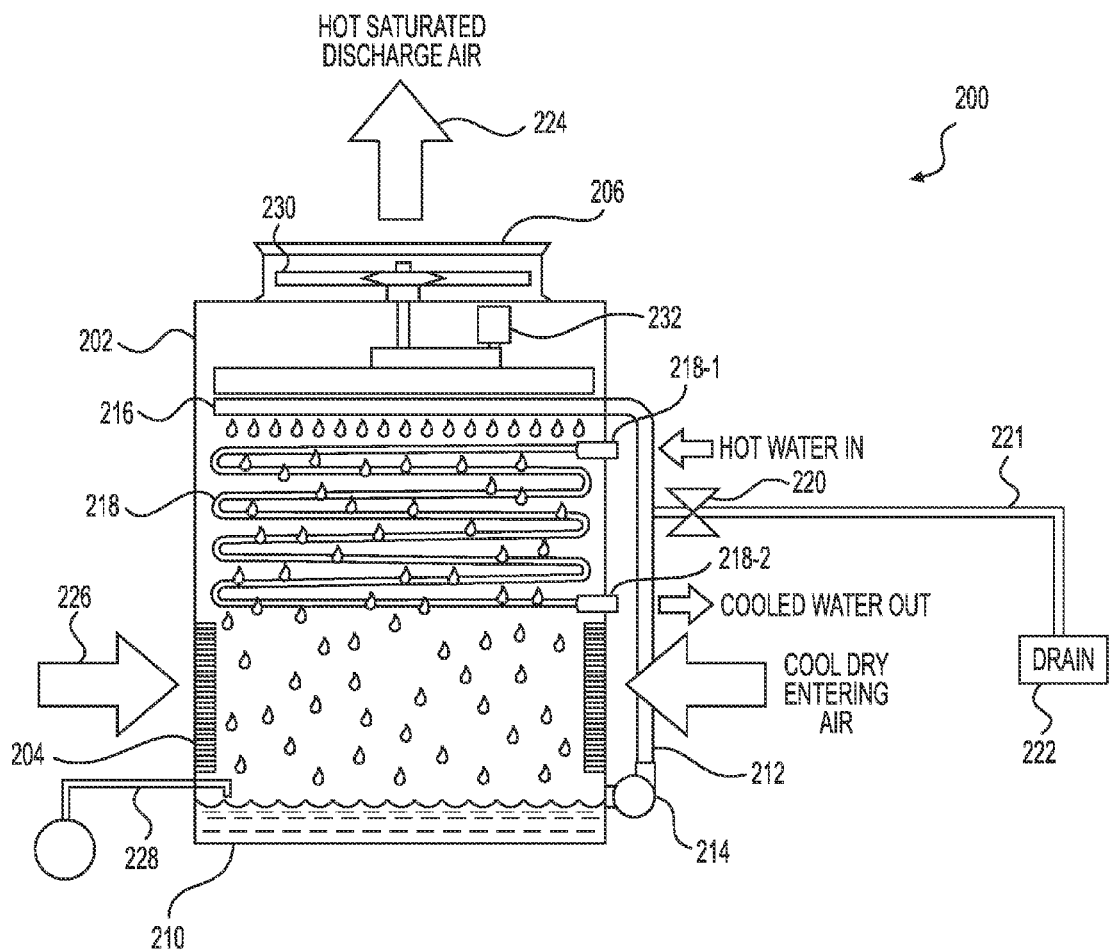
FIG. 4 is a schematic view of a typical indirect evaporative cooling system.

Unlike the typical evaporative cooling systems of FIGS. 3 and 4, the water bled from supply line 312 into bleed line 321 does not flow directly to drain 322. Rather, the bled water is fed from bleed line 321 to auxiliary evaporative media or pad 340 via distributor 342. Auxiliary evaporative media 340 is also referred to as dewatering media or sacrificial media. Auxiliary evaporative media 340 is disposed upstream of evaporative cooling apparatus 100, 200 with respect to the flow of air to be cooled. Airflow 323 entering auxiliary evaporative media 340 is cooled and humidified as airstream 324 that passes through primary evaporative pad 118 or heat exchanger 218. Air that flows through primary evaporative cooling apparatus 100, 200 is further cooled and humidified in a principal evaporative cooling process and exhausted as exhaust airflow 320. By precooling the air using auxiliary evaporative media 340 before entering the primary evaporative cooling process, bled water that would typically be wasted to drain is used to pre-cool the air and allow for improved efficiency and effectiveness of the evaporative cooling system.

The bleed water that passes over the dewatering media 340 is reduced in volume and increases in mineral content as it evaporates. As this occurs, scale will be deposited on the dewatering media 340. Depending on the setting of bleed valve 320, the water volume may be reduced to zero through complete evaporation before exiting dewatering media 340. Any water that does not evaporate and does pass completely through the dewatering media 340 is not returned to the sump, but directed to drain 322. This residual water will have a very high mineral content, and will have left behind a substantial amount of minerals and salts on the evaporative media. As such, the media will eventually become heavy with thickened and scaled walls and will need replacement or cleaning.

In that regard, a disposable or cleanable, low-efficiency evaporative cooling medium or pad 340 that pre-treats (pre-cools) the air that enters the primary evaporative cooling device and is wetted by the bleed water is preferred. The media is designed to be disposable or cleanable as the minerals will deposit on the surface as water evaporates. The openings in the media are designed with a pore dimension large enough to compensate for the shrinking that occurs as the scale build-up progresses.

Preferably, the wet bulb efficiency of the pre-treatment media is selected so that the majority of all of the bleed water is evaporated before it can leave the media. Depending on the ratio of bleed water to make-up water in the evaporative cooling system, the media wet bulb efficiency should be between about 10 and 50%; the higher the bleed rate, the higher the required evaporative efficiency.

It may not be practical to evaporate the water from the sacrificial media or pad at all times. This could most notably be due not to the sizing of the media, as described in detail below, but due to transitional effects of the system wherein intermittently excess water is applied to the sacrificial media and not all of it evaporates. There could be many reasons for this. The most notable reasons relate to the control system response time. Generally, a control system will bleed water based on the evaporation rate that has occurred in the past. If, for example, the humidity of the air rapidly increases to saturation, the controller will still try to bleed water to the sacrificial media, but the air will have no capacity to evaporate the water and remove the solids. Another example is where the water distribution on the evaporative media is not sufficiently homogeneous, possibly do to maintenance issues. Under these conditions, areas with higher than design water distribution flows may be not be able to completely evaporate the flow, resulting in bleed break-through in areas of the media. During these times, especially where the system has been designed to completely evaporate the bleed water, it may be best to direct the excess high mineral content water back to the main sump.

If this is done, additional precautions should be taken. If the above situations exist for a sufficient period of time, the bleed itself will not be able to remove sufficient solids from the recirculated system. The sacrificial pad may also start to act to selectively remove lower solubility mineral salts, such and calcium and silica based salts, while not precipitating out higher solubility salts, such as sodium or chloride based salts, or other contaminants in the water supply which may have regulations relating to the maximum concentration possible to discharge to a waste water stream.

In systems designed as such, to protect against build-up of these highly soluble minerals, a secondary bleed system which directs the water directly to drain may be fitted. This bleed should be based on a second bleed criterion different from the primary bleed described above. Examples of the control method would be to operate the bleed in a traditional manner at times when the TDS is above a second, higher concentration level, or if the primary bleed has not be able to respond and correct the IDS concentration over a given period of time, or by sensing the presence of the concentration of one of the highly soluble minerals and bleeding to drain when it exceeds a determined threshold.

Cycles of concentration (CoC) is a measure that compares the level of solids of the recirculating water to the level of solids of the original raw make-up water. For example, if the circulating water has four times the solids concentration than that of the make-up water, then the cycles of concentration is 4. For a given cycles of concentration, the preferred pre-treatment evaporative cooler efficiency can be calculated. To illustrate this point, the following tables outline evaporation rates and bleed rates given a system treating 1000 scfm of air with an evaporative media with an 85% efficiency rating.

Table 1 describes the air conditions as they change as the air travels first from an inlet with conditions of 95° F. dry bulb and 75° F. wet bulb through 85% efficiency evaporative media. In this table there is no dewatering pad so the efficiency for that pad is given as 0%. In the table, the units for airflow are both standard cubic feet per minute (scfm) and pounds per hour (lbs/hr), the units for water flow are lbs/hr, the units for humidity are grains per pound (gr/lb), and the dry bulb (db) and wet bulb (wb) temperatures are in degrees F.

TABLE 1

| Example 1: Dewater Evap Efficiency = 0% | | | | |
|---|---|---|---|---|
| airflow | | | 1000 | scfm |
| airflow | | | 4500 | lbs/hr |
| Cycles of Concentration | | | 2.2 | |
| Dewatering Pad Efficiency | | | 0% | |
| Direct Evaporative efficiency | | | 85% | |

| | Inlet Air | After Dewater | Direct Evap Cooler | Notes |
|---|---|---|---|---|
| db | 95 | 95 | 78 | |
| wb | 75 | 75.0 | 75 | |
| gr/lb | 99.1 | 99.1 | 126.9 | |
| Water Evaporated (lbs/hr) | | 0.0 | 17.9 | |
| Bleed to Dewatering Pad (lbs/hr) | | | 14.9 | Bleed = Evap Rate/(CoC − 1) |
| Water To Drain (lbs/hr) | | 14.9 | | |
| Resultant Cycles | | | 2.2 | (Evap Rate/Bleed Rate) + 1 |

In the table above. Evaporative (Evap) efficiency or Wet Bulb Efficiency is defined as (Temperature of the air entering−temperature of the air exiting an adiabatic evaporative exchanger)−(Temperature of the air entering−Web Bulb temperature of the air entering). By common definition, the bleed rate for a defined Cycles of Concentration can be calculated by the formula Bleed=Evaporation Rate/(CoC−1). In the example above, the air is cooled and humidified from 95° F. db, 75° F. wb, 99 gr/lb to 78° F. db, 75° F. wb and 127 gr/lb. The evaporative cooling results in an evaporation of 17.9 lbs per hour. In order to maintain the desired Cycles of Concentration at 2.2, 14.9 lbs/hr of water are required to be led to drain.

In a second example, the system is fitted with a dewatering pad with a 25% efficiency rating. The following table shows the results of the air traveling through the system.

TABLE 2

Example 2: Dewater Evap Efficiency = 25%

| | |
|---|---|
| airflow | 1000 scfm |
| airflow | 4500 lbs/hr |
| Cycles of Concentration | 2.2 |
| Dewatering Pad Efficiency | 25% |
| Direct Evaporative efficiency | 85% |

| Evap Efficiency | Inlet Air | After Dewater | Direct Evap Cooler | Notes |
|---|---|---|---|---|
| db | 95 | 90 | 77.25 | |
| wb | 75 | 75.0 | 75 | |
| gr/lb | 99.1 | 107.2 | 128.1 | |
| Water Evaporated (lbs/hr) | | 5.2 | 13.5 | |
| Bleed to Dewatering Pad (lbs/hr) | | | 11.2 | Bleed = Evap Rate/(CoC − 1) |
| Water To Drain (lbs/hr) | | 6.0 | | |
| Resultant Cycles | | 4.1 | | (Evap Rate/Bleed Rate) + 1 |

In this example, the air first is exposed to the dewatering pad where its temperature is first reduced from 95° F. to 90° F. and its moisture increased from 99 gr/lb to 107 gr/lb before it enters the primary direct evaporative cooling exchanger. In the exchanger, its temperature and moisture are further reduced to 77° F. and 128 gr/lb. As the dewatering pad has done some of the evaporative cooling work, the amount of water evaporated in the primary exchanger has been reduced from 17.9 lbs/hr to 13.5 lbs/hr. In order to maintain the primary exchanger sump with a Cycles of Concentration of 2.2, 11.2 lbs/hr must be bled. This water, however, does not go to drain, but is fed to the dewatering pad, where 5.2 lbs are evaporated. The remaining 6.0 lbs per hour are led to drain and the resultant CoC is increased from 2.2 to 4.1.

In a third example, the dewatering media efficiency is further increased to 35%.

TABLE 3

Example 3: Dewater Evap Efficiency = 35%

| | |
|---|---|
| airflow | 1000 scfm |
| airflow | 4500 lbs/hr |
| Cycles of Concentration | 2.2 |
| Dewatering Pad Efficiency | 35% |
| Direct Evaporative efficiency | 85% |

| | Inlet Air | After Dewater | Direct Evap Cooler | Notes |
|---|---|---|---|---|
| db | 95 | 88 | 77 | |
| wb | 75 | 75.0 | 75 | |
| gr/lb | 99.1 | 110.5 | 128.6 | |
| Water Evaporated (lbs/hr) | | 7.3 | 11.7 | |
| Bleed to Dewatering Pad (lbs/hr) | | | 9.7 | Bleed = Evap Rate/(CoC − 1) |
| Water To Drain (lbs/hr) | | 2.4 | | |
| Resultant Cycles | | 9.0 | | (Evap Rate/Bleed Rate) + 1 |

In this example, by increasing the efficiency of the dewatering pad the evaporating rate from the primary exchanger is further reduced to 11.7 lbs/hr resulting in a bleed to the dewatering media of 9.7 lbs/hr, of which 7.3 lbs are evaporated. The remaining 2.4 lbs/hr of water which leaves the dewatering media and goes to drain represents a CoC of 9 for the net evaporative cooler.

Taking the analysis to its conclusion, increasing the dewatering media evaporative efficiency to 42% results in no water remaining to go to drain and a resultant CoC approaching infinity.

TABLE 4

Example 4: Dewater Evap Efficiency = 42% - Bleed evaporated

| | |
|---|---|
| airflow | 1000 scfm |
| airflow | 4500 lbs/hr |

TABLE 4-continued

| Example 4: Dewater Evap Efficiency = 42% - Bleed evaporated | |
|---|---|
| Cycles of Concentration | 2.2 |
| Dewatering Pad Efficiency | 41.65% |
| Direct Evaporative efficiency | 85% |

| Evap Efficiency | Inlet Air | After Dewater | Direct Evap Cooler | Notes |
|---|---|---|---|---|
| db | 95 | 86.7 | 76.8 | |
| wb | 75 | 75.0 | 75.0 | |
| gr/lb | 99.1 | 112.7 | 129.0 | |
| Water Evaporated (lbs/hr) | | 8.7 | 10.5 | |
| Bleed to Dewatering Pad (lbs/hr) | | | 8.7 | Bleed = Evap Rate/(CoC − 1) |
| Water To Drain (lbs/hr) | | 0.0 | | |
| Resultant Cycles | | 1343615 | | (Evap Rate/Bleed Rate) + 1 |

As is shown by these examples, by adapting the dewatering efficiency to the CoC and the main evaporative load, the pre-treat evaporation rate can be made to match the main evaporator bleed rate. Alternatively, even higher efficiency media can be used to ensure more or all the water is evaporated, but at a cost of higher pressure drop and higher capital cost.

In the above examples, the total evaporative efficiency of the system increased by the addition of increasingly efficient dewatering pads. Another approach is to reduce the efficiency of the primary exchanger as the efficiency of the dewatering pad is increased. In the example below, the combination of a dewatering pad efficiency of 39% coupled with a primary exchanger efficiency of 77% results in air being conditioned to 78° F. db as in Example 1, but with no resultant bleed water.

TABLE 5

| Example 5: Netting of Total evap efficiency to equal the initial design | |
|---|---|
| airflow | 1000 scfm |
| airflow | 4500 lbs/hr |
| Cycles of Concentration | 2.2 |
| Dewatering Pad Efficiency | 39% |
| Direct Evaporative efficiency | 77% |

| | Inlet Air | After Dewater | Direct Evap Cooler | Notes |
|---|---|---|---|---|
| db | 95 | 87 | 78 | |
| wb | 75 | 75.0 | 75.0 | |
| gr/lb | 99.1 | 111.9 | 127.2 | |
| Water Evaporated (lbs/hr) | | 8.2 | 9.9 | |
| Bleed to Dewatering Pad (lbs/hr) | | | 8.2 | Bleed = Evap Rate/(CoC − 1) |
| Water To Drain (lbs/hr) | | 0.0 | | |
| Resultant Cycles | | 1908 | | (Evap Rate/Bleed Rate) + 1 |

An initial prototype was created to test the method and prototypical device. An evaporative cooler module designed to treat 10,000 scfm of air was positioned outdoors in the hot summer climate in San Antonio, Tex. The cooler included evaporative cooling media, in particular, Munters GLASdek 7060, 8" deep structured fill evaporative cooling media as the primary evaporative cooling pad, a sump with float fill valve, a recirculating pump to apply water continuously to the top of the GLASdek pad, and a fan to draw air across the cooler. The system was also fitted with a conductivity controller and a bleed valve in order to control sump Total Dissolved Solids (TDS).

Water analysis for the San Antonio water district (SAWS) was used to conduct a Puckorius scale index evaluation to determine the appropriate cycles of concentration (CoC). Table 6 below sets forth of values contained in the SAWS water quality report:

TABLE 6

| Make-up Water Analysis | | |
|---|---|---|
| Constituent | User Entry | Units |
| Ca (as CaCO3)* | 67.00 | mg/l, ppm |
| Mg (as CaCO3) | 14.20 | mg/l, ppm |
| T Alkalinity (as CaCO3)* | 220.00 | mg/l, ppm |
| Conductivity | 604 | µS/cm, µmhos/cm |
| pH** | 7.70 | units |

TABLE 6-continued

| Make-up Water Analysis | | |
|---|---|---|
| Constituent | User Entry | Units |
| Water Temp (° F.)* (Set by Administrator) | 70.00 | (° F.) |
| Silica (as SiO$_2$) = | 0.50 | mg/l, ppm |
| Chloride (as Cl$_2$) = | 20.00 | mg/l. ppm |
| Phosphate (as PO$_4$) = | 0.5 | mg/l, ppm |
| Iron (as Fe) = | 0.05 | mg/l, ppm |
| Manganese (as Mn) = | 14.20 | mg/l, ppm |
| Barium (as Ba) = | 0.00 | mg/l, ppm |
| Fluoride (as Fl) = | 0.10 | mg/l, ppm |

TABLE 6-continued

Make-up Water Analysis

| Constituent | User Entry | Units |
|---|---|---|
| Sulfate (as SO$_4$) = | 25 | mg/l, ppm |
| Sodium (as Na) = | 10 | mg/l, ppm |

Given the Puckorius scaling index evaluation in Table 7 below, it was decided to set the Cycles of Concentration for the test to 2.2. The value of 2.2 was chosen as it is slightly above ideal, but still stable and would provide a long scale-free primary exchanger life.

TABLE 7

| | # of Cycles | Calcium (as CaCO3) | Mg (as CaCO3) | TAlk (as CaCO3) | Conductivity (mmhg/cm) | pH (Estimated) | Water Temp (F.) | SiO2 (as such) |
|---|---|---|---|---|---|---|---|---|
| Recommended Maximum Values for Circulating Water | | Scaling Index Driven | No Limit | Scaling Index Driven | Scaling Index Driven | 6.8-8.5 | 95 | 125 |
| Raw Water | 1.00 | 67.0 | 14.20 | 230.0 | 604.0 | 7.7 | 70.0 | 0.50 |
| Low Cycles | 1.63 | 108.9 | 23.09 | 250.5 | 962.0 | 8.4 | 70.0 | 0.81 |
| Ideal Cycles | 20.2 | 135.5 | 28.71 | 311.6 | 1221.2 | 8.5 | 70.0 | 1.01 |
| High Cycles | 2.51 | 163.5 | 35.70 | 387.4 | 1518.6 | 8.6 | 70.0 | 1.26 |

| | # of Cycles | Chloride (as such) | Phosphate (as such) | Floride (as such) | Sulphate (as such) | Puckorius Index | Scaling Tendency |
|---|---|---|---|---|---|---|---|
| Recommended Maximum Values for Circulating Water | | 400 | 10 | 10 | | 6-7 | |
| Raw Water | 1.00 | 20.00 | 0.50 | 0.10 | 25.00 | 7.51 | Slight Scale Dissolving |
| Low Cycles | 1.63 | 32.52 | 0.81 | 0.16 | 40.64 | 7.00 | Very Slightly Scale Dissolving |
| Ideal Cycles | 20.2 | 40.44 | 1.01 | 0.20 | 50.55 | 6.50 | Ideal |
| High Cycles | 2.51 | 50.29 | 1.26 | 0.25 | 52.86 | 8.00 | Stable Water |

At the time of the test, the incoming water TDS was measured to be 250 ppm, so the conductivity controller was set to 550 ppm to achieve the desired CoC. The system was run with water meters on both the fill and bleed lines to confirm that an appropriate amount of water, approximately 45%, was bleeding in order to maintain the sump TDS at 550 ppm.

Next, the system was fitted with 2" deep CELdek 7060 evaporative cooling media on the inlet air stream as the auxiliary evaporative cooling media. Other types of evaporative media can also be used, such as Aspen pads made of random weaving of shaved aspen wood; however, design considerations would favor the use of a structured evaporative fill such as CELdek due to the low pressure drop and consistently sized air openings that will provide consistent and repeatable scale build-up with negligible effect on the air pressure drop. The bleed water that was used to control the main sump TDS was directed to the top of this media. Any water that left the bottom of the pads was measured and directed to drain.

Evaporative performance of the auxiliary media (dewatering media) was analyzed. Over the majority of the lace of the media, water completely evaporated from the surface of the media before it could exit the bottom to drain, while in areas where the water supply distributed to the top of the media was above the average, a portion of the water would make it to the bottom of the media and to drain. Despite this deficiency, the net amount of water leaving the pad to drain was reduced from 45% (CoC 2.2) to approximately 10% (CoC 10).

The weight of the media can be monitored over time to measure the scale buildup and determine how long it may be able to be used before it will need to be replaced or cleaned. In the example, after one week of operation there was no noticeable scale buildup on the auxiliary media. After one month, slight scale could be seen, but with no blocking of the air passages of the media. Estimation of the weight of scale that CELdek media can hold and the water bleed savings indicate that the media can provide an entire season's cooling (3-6 months) without replacement. Media with higher scale holding content, or media produced from polymeric materials or other materials that may be cleaned, can also be used.

In the example, the bled water was not uniformly distributed to the top of the auxiliary (dewatering) media. Preferably, however, the bleed water distribution to the top of the de-watering media is made as uniform as possible so that flow across the face is even and no channeling occurs. Channeling of the water flow allows excess flow to leave as system bleed in the high flow areas, which is detrimental to system performance.

Figure 2:
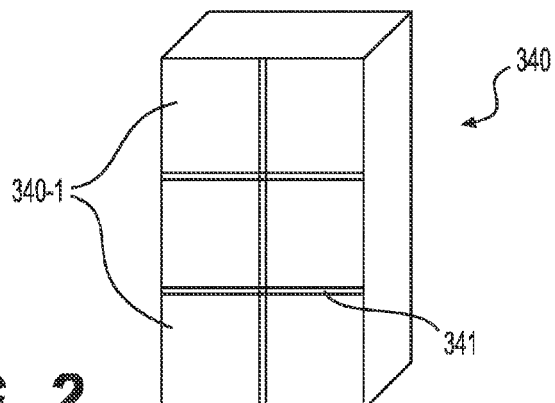
FIG. 2 is a perspective view of modified de-watering media used in the present invention.

Also, preferably the dewatering media is formed as a matrix of small modular media sections 340-1, as shown in FIG. 2. The modular media sections 340-1 are preferably mounted with a mechanism that allows them to be easily interchangeable, such as frame 341. As the media depth is small, the strength of the media to resist the force of airflow is low. Smaller, modularized sections in simple frames will allow for complete media support and provide for easy interchangeability. Additionally, by modularizing the media face, only those sections with the highest scale content would need replacing, reducing ongoing costs. This is important as it is expected that the upper media will scale more readily and thus need replacing more frequently.

It should be noted that in retrofit applications, the dewatering media can be added to the existing primary evaporative cooler inlet face. This, of course, creates added pressure drop and with it extra operating costs. For systems designed with the dewatering media as part of the initial system, the evaporative performance of the de-watering media can be included in the system performance, thus reducing the performance need on the primary evaporative surface. In such a manner the system could be designed with no substantial increase in pressure drop while increasing the CoC, thus reducing the water usage by a large factor.

One method of control involves sensing the location of a wet to dry line on the dewatering media. Ideally, the media should be wet nearly to its lower edge, with the lowest portion dry. The wetness of the media can be determined most easily by a sensor 350 that either measures the temperature of the media, directly or optically, or measures the temperature of the air exiting the media.

Another approach to control is to size the dewatering media efficiency above that required by the analysis of the suitable CoC for the given water quality. Bleed water can then be fed to the dewatering media at a rate that just allows for the bleed water to reach the exiting edge of the media. The presence of water can be monitored by the temperature method outlined above or by the use of a water presence detection system. As the efficiency of the dewatering media was oversized, more bleed water will have been taken from the main sump than was necessary, and the sump mineral level will be below the specified maximum content.

It should be noted that some evaporative cooling systems do not include a sump and recirculation pump. Instead, fresh water is applied to the evaporative section and any excess water that is not evaporated in the process is directed to drain. These "once-through" systems intentionally apply excess water so that the minerals in the water do not exceed a threshold which will allow for scale formation as the water evaporates in the process. Thus, ideally the water leaving the system is of nearly saturated mineral content and of small volume. In these cases the excess water which leaves the system with high mineral content can be utilized in the same manner as the bleed water in the examples above. It can be used to treat the dewatering media to reduce or eliminate its volume in the same fashion as the bleed water described in the recirculated water example. Therefore, the term "bleeding" can be used to connote both bleeding a portion of cooling fluid recirculating through a primary cooling unit as well as collecting the remaining "once-through" cooling fluid and supplying the collected fluid to the secondary cooling unit.

The auxiliary cooling system of the present invention is not exclusively for use with direct and indirect evaporative coolers. Any system that creates bleed or waste fluid and that could benefit from utilizing that fluid in a preconditioning process can be included within the scope of the invention. It should be noted that in indirect evaporative systems, the heat load and thus the primary evaporation rate is not necessarily contingent on the ambient conditions of the air into which the water is being evaporated. In these systems, heat is being transferred from a heat load within the exchanger to a second air stream, the scavenger air stream. When scavenger (or the cooling) air is dry it will have a large ability to evaporate the bleed water from the sacrificial media as the air passes over it on the way to the cooling heat exchanger. When the scavenger air has a high relative humidity, the amount of bleed water that can be evaporated in the sacrificial media is limited. In this case, a sacrificial pad with a very high evaporative efficiency may be insufficient to evaporate all the bleed water.

Thus, for indirect evaporative systems where the load being cooled is decoupled from the sacrificial air conditions, an optimal sacrificial media effectiveness cannot be calculated. Thus, it may be beneficial to increase the evaporative pad efficiency up to 95% as the bleed water rate is proportional to the evaporative load which is now likely higher than the available adiabatic evaporating potential of the cooling air stream.

Thus, there has been shown and described new and useful evaporative cooling systems. Although this invention has been exemplified for purposes of illustration and description by reference to certain specific embodiments, it will be apparent to those skilled in the art that various modifications, alterations, and equivalents of the illustrated examples are possible.

What is claimed is:

1. An evaporative cooling system comprising:
  a primary cooling unit that utilizes a cooling fluid flowing through a primary heat exchange medium to cool supply air flowing past the primary heat exchange medium, the primary cooling unit including a supply line for supplying the cooling fluid to the primary heat exchange medium, a return reservoir for collecting the cooling fluid supplied to the primary heat exchange medium, and a pump for recirculating the cooling fluid collected in the reservoir back to the supply line;
  a bleed line configured to bleed a portion of the recirculating cooling fluid from the primary cooling unit; and
  a secondary cooling unit disposed upstream of the primary cooling unit with respect to a flow direction of supply air, the secondary cooling unit comprising a secondary heat exchange medium configured to receive the cooling fluid bled from the primary cooling unit through the bleed line.

2. The evaporative cooling system according to claim 1, wherein the primary cooling unit comprises a direct evaporative cooler.

3. The evaporative cooling system according to claim 1, wherein the primary cooling unit comprises an indirect evaporative cooler.

4. The evaporative cooling system according to claim 1, wherein the secondary heat exchange medium comprises evaporative cooling media.

5. The evaporative cooling system according to claim 1, wherein the secondary heat exchange medium is of modular form, with each module of the secondary heat exchange medium being individually replaceable.

6. The evaporative cooling system according to claim 1, further comprising a controller for controlling the magnitude of the portion of the recirculating cooling fluid bled from the primary cooling unit.

7. The evaporative cooling system according to claim 6, wherein the controller senses a condition of the recirculated water and accordingly controls the magnitude of the portion of the recirculating cooling fluid bled from the primary cooling unit.

8. The evaporative cooling system according to claim 6, further comprising a sensor used in controlling the magnitude of the fluid bled from the primary cooling unit by sensing a lower extent to which the cooling fluid bled from the primary cooling unit reaches in the secondary heat exchange medium and the controller controls the rate of the water flow over the secondary exchanger so that the lower extent reaches a predetermined level.

9. The evaporative cooling system according to claim 1, wherein the secondary heat exchange medium is selected and the portion of the recirculating cooling fluid bled from the primary cooling unit is controlled such that the entire bled portion of the recirculating cooling fluid is evaporated in the secondary cooling unit.

10. A gas conditioning system comprising:
- a primary conditioning unit configured to condition a gas flowing therethrough, the primary conditioning unit utilizing a conditioning fluid to condition the flowing gas;
- a bleed line configured to bleed a portion of the conditioning fluid from the primary conditioning unit; and
- a secondary conditioning unit disposed upstream of the primary conditioning unit with respect to a flow direction of the gas, the secondary conditioning unit utilizing the conditioning fluid bled from the primary conditioning unit through the bleed line to pre-condition the flowing gas.

11. The gas conditioning system according to Claim 10, wherein the primary conditioning unit comprises a direct evaporative cooler.

12. The gas conditioning system according to Claim 10, wherein the primary conditioning unit comprises an indirect evaporative cooler.

13. The gas conditioning system according to Claim 10, wherein the secondary conditioning unit pre-conditions the flowing gas by cooling the flowing gas via evaporative cooling media that uses the conditioning fluid received through the bleed line.

14. The gas conditioning system according to Claim 10, wherein the conditioning fluid is recirculated through the primary conditioning unit and the bleed line bleeds the portion of the recirculating conditioning fluid from the primary conditioning unit.

15. The gas conditioning system according to Claim 14, further comprising a controller for controlling the magnitude of the portion of the recirculating conditioning fluid bled from the primary conditioning unit.

16. The gas conditioning system according to Claim 10, further comprising evaporative cooling media provided in the secondary conditioning unit and a sensor for sensing a lower extent to which the conditioning fluid bled from the primary conditioning unit and received by the evaporative cooling media reaches.

17. A method of cooling supply air in an evaporative cooling system, the method comprising:
- supplying cooling fluid to a primary evaporative heat exchange medium;
- bleeding a portion of the cooling fluid supplied to the primary evaporative heat exchange medium;
- supplying the bled cooling fluid to a secondary evaporative heat exchange medium; and
- flowing supply air through the primary evaporative heat exchange medium and the secondary evaporative heat exchange medium.

18. The method according to Claim 17, wherein the cooling fluid is collected and recirculated through the primary evaporative heat exchange medium and the bleeding bleeds the portion of the recirculating cooling fluid from the primary evaporative heat exchange medium.

19. The method according to Claim 18, further comprising controlling the magnitude of the portion of the recirculating cooling fluid bled from the primary evaporative heat exchange medium.

20. The method according to Claim 17, wherein the secondary evaporative heat exchange medium comprises evaporative cooling media and evaporation of the cooling fluid supplied to the evaporative cooling media is used to pre-cool the air flowing through the evaporative cooling media before flowing through the primary evaporative heat exchange medium.

21. The method according to Claim 17, further comprising sensing a lower extent to which the cooling fluid bled from the primary evaporative heat exchange medium and supplied to the secondary evaporative heat exchange medium reaches.

* * * * *